W. F. BETZELL.
VEHICLE WHEEL.
APPLICATION FILED SEPT. 16, 1920.
1,415,427. Patented May 9, 1922.
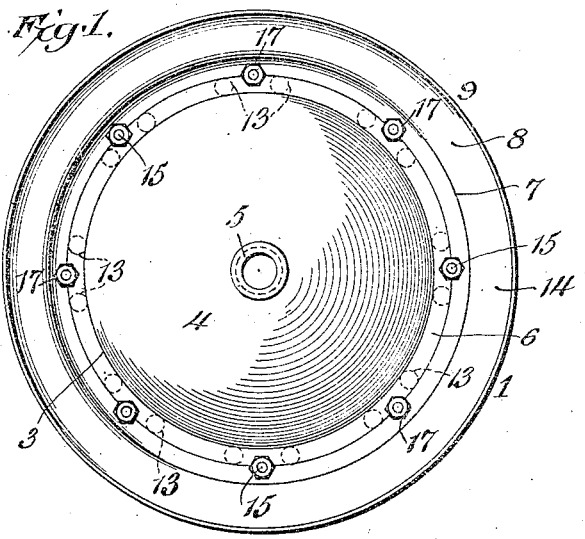
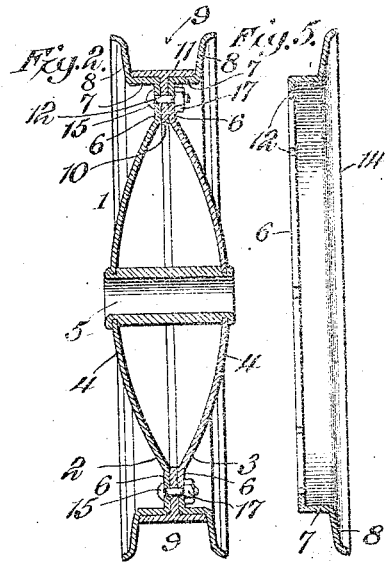
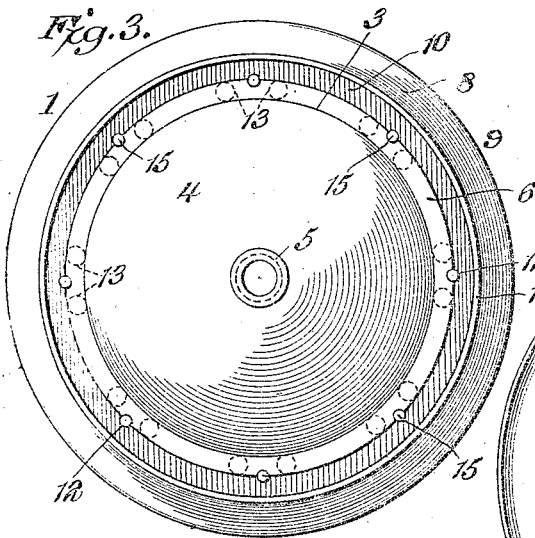
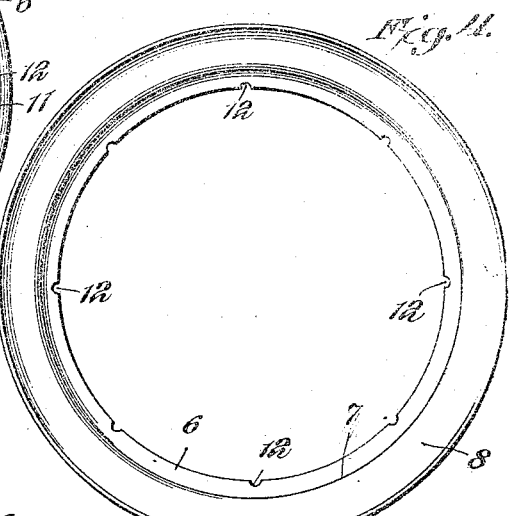
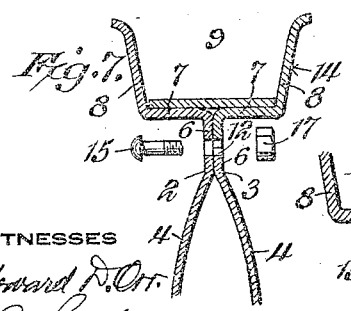
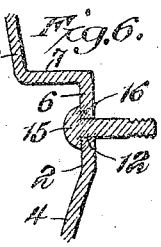
WITNESSES
W. F. Betzell, INVENTOR
BY
ATTORNEY

UNITED STATES PATENT OFFICE.

WILLIAM F. BETZELL, OF WASHINGTON, DISTRICT OF COLUMBIA.

VEHICLE WHEEL.

1,415,427.   Specification of Letters Patent.   Patented May 9, 1922.

Application filed September 16, 1920. Serial No. 410,714.

*To all whom it may concern:*

Be it known that I, WILLIAM F. BETZELL, a citizen of the United States, residing at Washington, in the District of Columbia, have invented a new and useful Vehicle Wheel, of which the following is a specification.

This invention has reference to vehicle wheels, and more particularly to the type of wheels known as disk wheels, and its object is to provide a disk wheel with a removable flange whereby to hold the tire upon the wheel.

The invention comprises an automobile wheel of light, yet rigid construction, less liable to collapsing than other types of automobile wheels designed to carry pneumatic tires. The structure is of a character strongly resistant to side strains and capable of being made wholly of metal and so assembled as to be of effectively one piece, although actually of more than one piece, with no protuberances to cause noisy action when traveling at high speed, while the construction permits the manufacture of the wheel at relatively low cost.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:—

Fig. 1 is a face view of the completed wheel, omitting the tire.

Fig. 2 is a diametric section of the wheel shown in Fig. 1.

Fig. 3 is a face view similar to Fig. 1, but with the removable rim omitted.

Fig. 4 is a face view of the rim omitted from Fig. 3.

Fig. 5 is a diametric section of the rim shown in Fig. 4.

Fig. 6 is a section through the integral rim and flange, showing one of the bolts welded in place.

Fig. 7 is a diametric section of the rim portion of the wheel somewhat modified in the construction from the showing of Fig. 2.

Referring to the drawing, there is shown a disk wheel 1 composed of two face members 2 and 3, which may be substantially identical and each formed of an outwardly bulged member 4, connected together to form a double convex body, with a central hub 5 separately formed from the body member and secured thereto axially in any appropriate manner. Toward the periphery of the wheel, the two members 2 and 3 approach each other and each member terminates in a radial portion 6, the two portions being parallel one to the other and extending toward the peripheral portion of the wheel and then diverging oppositely at substantially right angles to a radial plane, as shown at 7, so that the two oppositely extending portions with approximately outstanding terminal flanges 8 provide a channel rim 9, circumferentially of the wheel to receive the tire, which tire is not shown in the drawing. It is to be understood that the channel rim 9 may follow any of the customary forms and is not at all confined to the particular cross sectional shape indicated. It is also to be understood that the flanges 8 may be shaped to receive and hold different types of tire beads, so that the wheel may receive and lock the tires onto the wheel.

In the form shown in Fig. 1 and associated figures, the flanges 6 engage opposite faces of a circumferential flange 10 carrying a peripheral ring 11 of a width to seat in the rim channel 9.

When the two face members 2, 3 are assembled with the flange 10 between them and the ring 11 seated in the rim or channel 9, bolt holes 12 are bored at appropriate points through the flanges 6 and 10, which flanges are spot welded as indicated by dotted lines at 13. This produces a substantially integral union with the united points interior to a line centrally cutting the bolt holes and concentric with the axis of the wheel. The rim portion of one of the two body members, say the member 3, is thereby separated from the body portion of the same member, leaving the inner periphery of such rim, which rim is shown at 14, separated from and unattached to the body member 3, although the latter, minus the rim, is firmly attached to the body member 2.

The bolt holes through the flanges 6 and 10 are traversed by bolts 15, with the head ends of the bolts then secured to the flange 6 of the body member 2 by welding, as indicated at 16 in Fig. 6, whereby the head ends of the bolts are made substantially integral with the flange 6 of the body member 2, and this welding may be continued between each bolt 15 and the flange 10, leaving the end of the bolt remote from its head projecting beyond the corresponding flange 6 of the body member 2 sufficiently to receive a nut 17, the stem of the bolt being, of course, suitably threaded for the purpose.

When the bolt holes have been bored and the flange constituting the removable flange 14 is appropriately severed from the body member 3, the portions of the bolt holes remaining in the flange 14 serve to center the flange on the wheel because of the presence of the bolts 15. This greatly facilitates the placing of the removable flange after having been removed and when applying a tire and securing it in place by replacing the removed flange. On again applying the nuts 17 and screwing them tightly into place, an applied tire becomes firmly attached to the wheel, as occurs in the ordinary practice of utilizing demountable rims.

The ring 11 serves to stiffen the rim of the wheel and form a support for the bead portion of the tire and for other parts of the tire when present. The ring is fixedly secured by welding or in any other approved manner to that terminal flange of the sheet metal disk which has not been severed from the disk, so that the ring extends laterally of the tire receiving channel and in overhanging relation with the removable flange. The ring 11 need not be furnished with a flange 10, for a simple ring 11ª, such as shown in Figs. 7 and 8, may be employed. In this case, the flange 10 is not introduced between the flanges 6, but the latter are brought into face to face contact and are spot welded together as in the structure of Fig. 1 and associated figures, and the bolts 15, which may be welded to one face plate 2, are used as in the structure of Fig. 1, with the flange 14 held in place by the nuts 17. The structure of Fig. 7 is substantially the same as that of Fig. 1 and associated figures except for the omission of the flange 10 and the direct contact with the flanges 6.

What is claimed is:

1. An automobile wheel comprising two sheet metal disks bulging oppositely from the rim portion of the wheel toward the axial portion thereof to produce a double convex wheel body, each disk terminating at the peripheral portion in a tire-retaining flange, with the flanges together forming a tire-receiving channel, said wheel having a flat transverse ring seated in the channel and provided with an interior radial flange interposed between the disks, means for uniting the disks and radially flanged ring together, and means for holding one of the tire-retaining flanges removably in place on the wheel.

2. A sheet metal automobile wheel comprising two like sheet metal disks, bulging oppositely from the rim portion of the wheel toward the axle portion thereof to produce a double convex wheel body, each disk terminating at the peripheral portion with a laterally and outwardly extending tire-retaining flange said flanges cooperating to define a tire-receiving channel, one of said flanges being removable from the disk, a flat transverse ring fixedly seated in the channel and extending laterally thereof and overhanging the removable flange, the width of the ring being substantially the width of the tire-receiving channel, means for uniting the disks, and bolts for holding the removable tire-retaining flange in place on the wheel.

3. A sheet metal automobile wheel comprising two like sheet metal disks, bulging oppositely from the rim portion of the wheel towards the axle portion thereof to produce a double convex wheel body, each disk terminating at the periphery with a radial portion and an outwardly extending tire retaining flange said flanges cooperating to define a tire-receiving channel, a flat transverse ring seated in the channel and extending laterally thereof from opposite sides of the peripheries of the sheet metal disk and in supporting relation with the tire-retaining flanges, said disks being provided at the radial portions with a series of perforations for the reception of bolts, one of said disks being cut through the centers of the perforations whereby one of the tire-retaining flanges is removable from the wheel, and nuts on the bolts adapted to engage the disk and the removably mounted tire-retaining flange for holding the same in position.

In testimony that I claim the foregoing as my own, I have hereto affixed my signature.

WILLIAM F. BETZELL.